United States Patent
Paluch et al.

(10) Patent No.: US 12,200,485 B2
(45) Date of Patent: *Jan. 14, 2025

(54) METHOD FOR PAIRING A MOBILE DEVICE WITH A WIRELESS NETWORK

(71) Applicant: Comcast Cable Communications, LLC, Philadelphia, PA (US)

(72) Inventors: Bryan Paluch, Philadelphia, PA (US); Arpit Mathur, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/524,513

(22) Filed: Nov. 11, 2021

(65) Prior Publication Data

US 2022/0286847 A1   Sep. 8, 2022

Related U.S. Application Data

(63) Continuation of application No. 13/771,625, filed on Feb. 20, 2013, now Pat. No. 11,206,532.

(51) Int. Cl.
*H04W 12/06* (2021.01)
*H04W 12/50* (2021.01)

(52) U.S. Cl.
CPC .......... *H04W 12/06* (2013.01); *H04W 12/50* (2021.01)

(58) Field of Classification Search
CPC .... H04L 67/1001; H04L 63/08; H04W 84/12; H04W 12/08; H04W 12/062; H04W 12/06; H04W 12/50; H04W 4/14; H04W 12/73; H04W 12/37; H04W 12/086
See application file for complete search history.

(56) References Cited

U.S. PATENT DOCUMENTS

| | | | |
|---|---|---|---|
| 8,046,578 B1* | 10/2011 | Trudeau | H04L 63/08 |
| | | | 713/162 |
| 2006/0116110 A1* | 6/2006 | Chen | H04W 68/00 |
| | | | 455/412.2 |
| 2008/0205340 A1 | 8/2008 | Meylan et al. | |
| 2009/0049526 A1 | 2/2009 | Zhang et al. | |
| 2009/0217048 A1 | 8/2009 | Smith | |
| 2011/0092185 A1* | 4/2011 | Garskof | H04L 63/083 |
| | | | 455/411 |
| 2011/0237222 A1 | 9/2011 | Niejadlik | |
| 2012/0195295 A1 | 8/2012 | Elmaleh | |
| 2013/0050259 A1* | 2/2013 | Ahn | G06F 3/1454 |
| | | | 345/633 |
| 2013/0084835 A1 | 4/2013 | Scherzer et al. | |
| 2013/0091279 A1* | 4/2013 | Haddad | H04L 63/08 |
| | | | 709/225 |
| 2014/0068719 A1 | 3/2014 | Kiukkonen et al. | |
| 2014/0180856 A1* | 6/2014 | Lau | G06Q 20/20 |
| | | | 705/21 |

* cited by examiner

*Primary Examiner* — Allahyar Kasraian
(74) *Attorney, Agent, or Firm* — Ballard Spahr LLP (57) ABSTRACT

Disclosed herein are systems and methods for associating a device with a network, such as a wireless network. One method comprises storing network identifying information for a network in a database, receiving contact information from a computing device, determining whether the contact information is associated with the network identifying information in the database, and coupling the computing device with the network in response to determining that the contact information is associated with the network identifying information.

20 Claims, 5 Drawing Sheets

METHOD FOR PAIRING A MOBILE DEVICE WITH A WIRELESS NETWORK

CROSS-REFERENCE TO RELATED APPLICATIONS

This application is a continuation of application Ser. No. 13/771,625, filed Feb. 20, 2013, which is incorporated herein in its entirety.

BACKGROUND

Computing devices, such as mobile devices, can access networks such as the Internet via WiFi networks or cellular data networks and the like. However, many WiFi and similar subscription based networks often place restrictions on device access to the network, requiring passwords or other authentication information for access. When mobile device users travel with their devices, they may wish to access the WiFi network of various network owners or operators at various locations. Similarly, the owner or operator of a WiFi network may wish to allow others to access their WiFi network. However, if the network users wish to allow one or more mobile device users to access their networks, they often have to go through a tedious authentication process, where data such as login names, passwords, etc. must be shared. Also, authentication credentials can be difficult to input and the owner or operator may not wish to share this information. These and other shortcomings are addressed by the present disclosure.

SUMMARY

It is to be understood that both the following general description and the following detailed description are exemplary and explanatory only and are not restrictive. Provided are methods and systems for coupling a device with a network. In an aspect, one or more of network identifying information for the network and user (or user device) identifying information can be stored, e.g., in a database. As an example, the user identifying information can be associated with the network identifying information. In another aspect, when a device attempts to connect to the network, the method can use contact information associated with the device to determine whether the contact or identifying information is associated with the network identifying information in the database. If the contact information is found to be associated with the network identifying information, the device can be connected or coupled to the network, which may also be known as device pairing.

In an aspect, a method can comprise storing network identifying information for a network in any type of memory, such as in a database. Contact information can be received from a computing device. It can be determined whether the contact information is associated with the network identifying information in the database. As such, the computing device can be coupled with the network in response to determining that the contact information is associated with the network identifying information.

In another aspect, a system can comprise a network having network identifying information. The system can also comprise a first computing device in communication with the network and a second computing device. As an example, the first computing device can comprise or have access to user identifying information associated with the network identifying information. The first computing device can be configured to receive contact information from the second computing device. The first computing device can be configured to transmit credentials for accessing the network to the second computing device in response to determining that the user identifying information associated with the network identifying information matches the contact information.

In a further aspect, a method can comprise receiving device specific information, such as a media access control (MAC) address, a first computing device associated with a first network. The MAC address and contact information can be transmitted to a second computing device using a second network. It can be determined whether the contact information matches user identifying information associated with the MAC address. As such, the first computing device can be coupled with the first network in response to determining that the contact information matches the user identifying information associated with the MAC address.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of exemplary embodiments and the examples included therein and to the figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium can be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions can be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions can also be stored in a computer-readable memory that can direct a computer or other programmable data processing apparatus to function in a particular manner, such that the instructions stored in the computer-readable memory produce an article of manufacture comprising computer-readable instructions for implementing the function specified in the flowchart block or blocks. The computer program instructions can also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Figure 1:
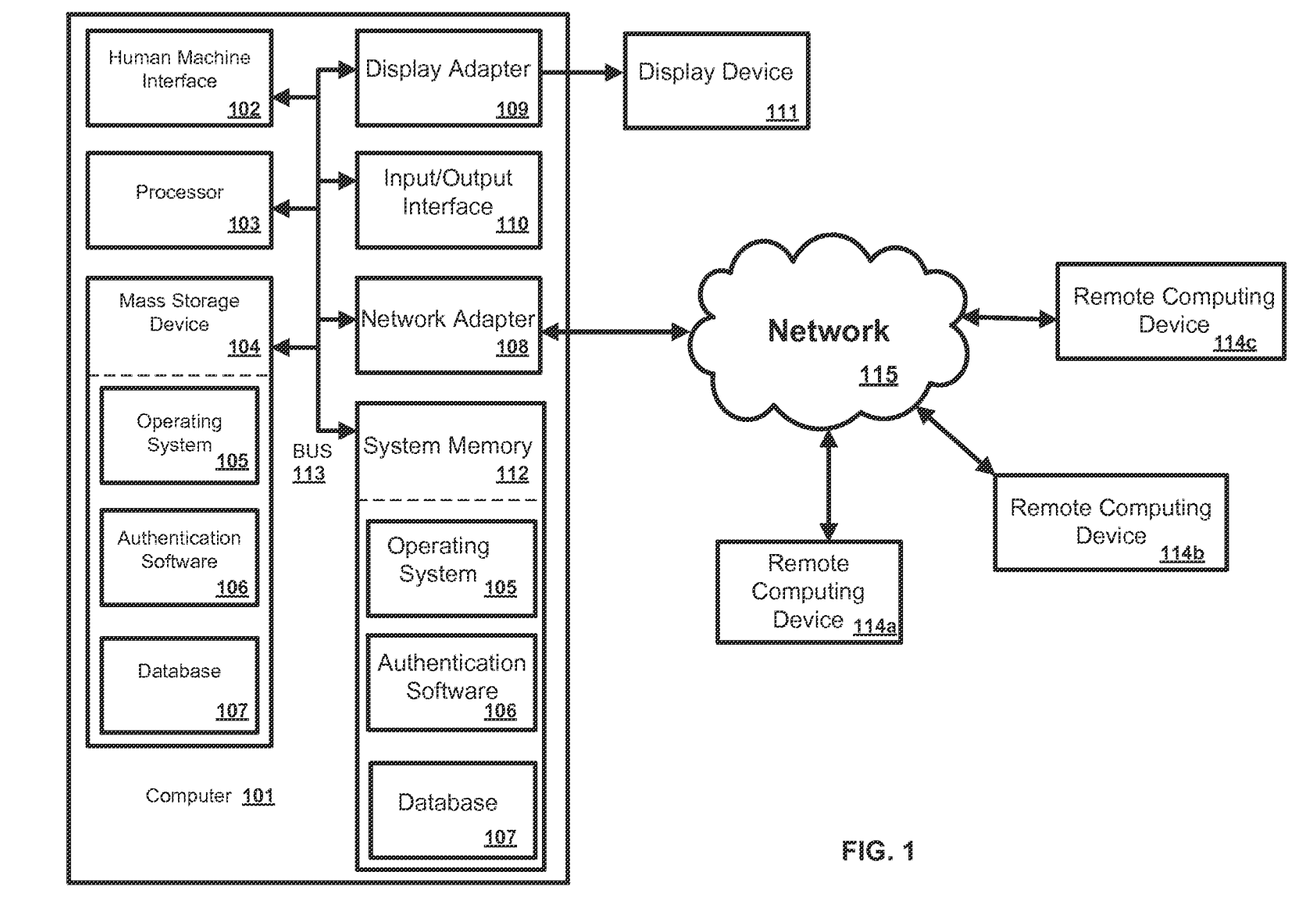
FIG. 1 is a block diagram illustrating an exemplary computer system and network.

FIG. 1 is a block diagram illustrating an exemplary embodiment of a computer system and a network. This is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be used with numerous other general purpose or special purpose computing system environments or configurations. Examples of well known computing systems, environments, and/or configurations that can be suitable for use with the systems and methods include, but are not limited to, mobile devices, tablet computers, cellphones, personal computers, server computers, laptop devices, and multiprocessor systems. Additional examples comprise set top boxes, programmable consumer electronics, network PCs, minicomputers, mainframe computers, distributed computing environments that include any of the above systems or devices, and the like.

The processing of the disclosed methods and systems can be performed by software components. The disclosed systems and methods can be described in the general context of computer-executable instructions as program modules, being executed by one or more computers or other devices. Program modules can include computer code, routines, programs, objects, components, and data structures, that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Turning to FIG. 1, one skilled in the art will appreciate that the systems and methods disclosed herein can be implemented via a general-purpose computing device in the form of a computer 101. The components of the computer 101 can include, but are not limited to, one or more processors or processor units 103, a system memory 112, and a system bus 113 coupling various system components including the processor 103 to the system memory 112. In the case of multiple processing units 103, the system can utilize parallel computing.

The system bus 113 represents one or more of several possible types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnects (PCI), a PCI-Express bus, a Personal Computer Memory Card Industry Association (PCMCIA), Universal Serial Bus (USB) and the like. The bus 113, and all buses specified in this description can be implemented over a wired or wireless network connection and each of the subsystems, including the processor 103, a mass storage device 104, an operating system 105, authentication software 106, database 107, a network adapter 108, system memory 112, an Input/Output Interface 110, a display adapter 109, a display device 111, and a human machine interface 102, can be contained within one or more remote computing devices 114a,b,c at physically separate locations, connected through wired or wireless buses, in effect implementing a fully distributed system.

The computer 101 can include a variety of computer readable media. Exemplary readable media can be any available media that is accessible by the computer 101 and includes, for example and not meant to be limiting, both volatile and non-volatile media, removable and non-removable media. The system memory 112 comprises computer readable media in the form of volatile memory, such as random access memory (RAM), and/or non-volatile memory, such as read only memory (ROM). The system memory 112 can contain data in a database 107, for example to collect contact information, and program modules such as operating system 105 and authentication software 106 that are immediately accessible to and are operated on by the processing unit 103.

In another aspect, the computer 101 can also include other removable/non-removable, volatile/non-volatile computer storage media. By way of example, FIG. 1 illustrates a mass storage device 104, which can provide non-volatile storage of computer code, computer readable instructions, data structures, program modules, and other data for the computer 101. For example and not meant to be limiting, a mass storage device 104 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules can be stored on the mass storage device 104, including by way of example, an operating system 105 and authentication software 106. Each of the operating system 105 and authentication software 106 (or some combination thereof) can include elements of the programming and the network authentication software 106. Contact information database 107 can also be stored on the mass storage device 104. Contact information database 107 can be stored in any of one or more databases known in the art. Examples of databases include, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 101 via an input device (not shown). Examples of input devices may include, but are not limited to, a keyboard, pointing device (e.g., a "mouse"), a microphone, a joystick, a scanner, tactile input devices such as gloves, and other body coverings, and the like. These and other input devices can be connected to the processor 103 via a human machine interface 102 that is coupled to the system bus 113, but can be connected by other interface and bus structures, such as a parallel port, game port, an IEEE 1394 Port (also known as a Firewire port), a serial port, or a universal serial bus (USB).

In yet another aspect, a display device 111 can also be connected to the system bus 113 via an interface, such as a display adapter 109. It is contemplated that the computer 101 can have more than one display adapter 109 and the computer 101 can have more than one display device 111. For example, a display device can be a monitor, an LCD (Liquid Crystal Display), or a projector. In addition to the display device 111, other output peripheral devices can include components such as speakers (not shown) and a printer (not shown) which can be connected to the computer 101 via Input/Output Interface 110. Any step and/or result of the methods can be output in any form to an output device. The output can be any form of visual representation, including, but not limited to, textual, graphical, animation, audio, tactile, and the like. The display 111 and computer 101 can be part of one device, or separate devices.

The computer 101 can operate in a networked environment using logical connections to one or more remote computing devices 114a,b,c. By way of example, a remote computing device can be a personal computer, portable computer, smartphone, a server, a router, a network computer, a peer device or other common network node, and so on. Logical connections between the computer 101 and a remote computing device 114a,b,c can be made via a network 115, such as a local area network (LAN) and/or a general wide area network (WAN). Network connections can be through a network adapter 108, which can be implemented in both wired and wireless environments. Networking environments can be found in dwellings, offices, enterprise-wide computer networks, intranets, and the Internet.

For purposes of illustration, application programs and other executable program components such as the operating system 105 are illustrated herein as discrete blocks, although it is recognized that programs and components can reside at various times in different components of the computing device 101, and are executed by the data processor(s) of the computer. An implementation of authentication software 106 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can include "computer storage media" and "communications media." "Computer storage media" can comprise volatile and non-volatile, removable and non-removable media implemented in any methods or technology for storage of information such as computer readable instructions, data structures, program modules, or other data. Exemplary computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Figure 2:
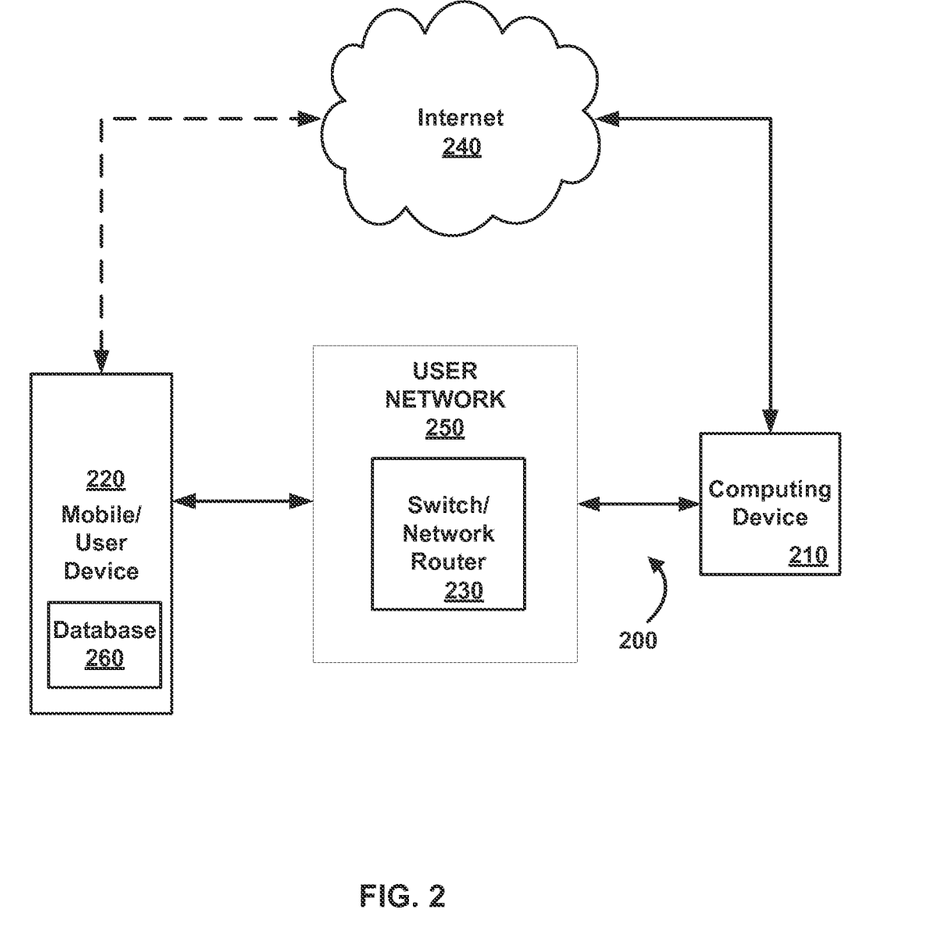
FIG. 2 is a block diagram illustrating an exemplary computer in which the methods and systems described herein can operate.

FIG. 2 illustrates various aspects of an exemplary system in which the present methods and systems can operate. The present disclosure relates to methods and systems for authenticating and coupling a device with a network. Those skilled in the art will appreciate that present methods can be used in systems that employ both digital and analog equipment. One skilled in the art will appreciate that provided herein is a functional description and that the respective functions can be performed by software, hardware, or a combination of software and hardware.

In an aspect, the system 200 illustrates a local area network (LAN) or a user network 250 that can be implemented by a network user (e.g., owner, subscriber, provider), at a premises such as a home or place of business. In another aspect, the network user can subscribe to an Internet service provider (ISP) to gain access to the Internet. As an example, the ISP can serve as a gateway for allowing the network user to incorporate devices such as network routers or switches 230 which can route Internet communications to and from Internet connected devices to the Internet.

The network user can connect the switch or network router 230 to an Internet access port with the ISP to create a network such as local area network (LAN) 250. Several implementations of a switch or network router 230 can comprise a wireless (e.g., WiFi) radio built into the router 230 for creating a network, for example, a wireless personal area network (WPAN). In an aspect, the methods disclosed herein relate to a WiFi network based on the institute for electrical and electronics engineers (IEEE) 802.11 standards. However, other wireless standards can be used including Bluetooth standards, ultra-wide band technologies, cellular, microwave, near-field communication technologies, spread spectrum technologies, and the like. Also, the methods disclosed herein could also be implemented in a wired network environment such as an Ethernet 802.03 standard.

The network 250, for example a WiFi WPAN, can have an identifier associated therewith. In an aspect, the identifier can be a public identifier such as a service set identifier (SSID), the name of the wireless network, and/or an address associated with a network device such as a gateway or router. The SSID can be a case sensitive, alphanumeric character unique identifier attached to the header of data packets sent over the network that acts as a password when a computing device, such as a wireless device, tries to connect the network's basic service set (for example BSS, a component of the IEEE 802.11 WPAN architecture). Examples of other identifiers, can include media access control address (MAC address), Internet protocol address (IP address), wired equivalent privacy (WEP), and the like. The SSID differentiates one network from another, so all access points and all devices attempting to connect to a specific network 250 must use the specific SSID of the network to enable a connection to the network.

As part of the association process, in a pairing, a computing device such as user device 220 can select the network identifier being broadcast over the network 250. Once network identifier is selected, the user device 220 can be prompted to enter a password for accessing the network 250. If an incorrect password is entered, the user device 220 will not be permitted to join the network 250. However, once the correct password is entered, the user device 220 is allowed to access the network 250, that is, the device is paired or coupled with the network.

Examples of a computing device can include a client device, a wireless communications device, such as a smartphone, mobile phone, tablet computer, laptop computer, mp3 player, global positioning system (GPS) device, personal digital assistant (PDA) and the like. A computing device such as user device 220 can comprise a plurality of transceiver radios for communications over a cellular telecommunications network, Bluetooth network, WiFi network and the like. Therefore, in an exemplary embodiment, the user device 220 can communicate with both wired networks and wireless networks such as WiFi, Bluetooth and cellular telecommunications networks. In addition, the user device 220 can comprise a plurality of sensors such as a GPS sensor, touch screen, proximity sensors, gyro sensors, and so forth. The user device 220 can also be a computing device as disclosed in the discussion of FIG. 1 and is capable of executing program instructions called applications or apps.

In an aspect, applications executing on the user device 220 can allow the user device 220 to access various computer networks 250 such as, by way of example, a WiFi Internet network. The user device 220 can also store data, such as a contact information database 260, which can contain contact information such as the names, addresses, phone numbers, email addresses, etc. of contacts stored on the user device 220. Furthermore, various wireless communication means can allow the user device 220 to access data and applications remotely via the Internet over the WiFi and/or cellular telecommunications networks mentioned.

In an aspect, the system can also include a computing device such as server 210. The server 210 can be accessible via a network such as the Internet 240 and/or network 250 by one or more of user device 220, network router 230, or other computing devices. In another aspect, the server 210 can be a component of the router 230. The server 210 can be a computer as described in FIG. 1. As an example, the server 210 can execute a plurality of applications including an authentication program for authenticating devices attempting to connect to the network 250. The server 210 can also comprise a database containing network media access control (MAC) addresses, SSID's, network user data, and/or other information for use by an authentication application.

In an aspect, methods and systems disclosed herein can be implemented on a computer 101 as illustrated in FIGS. 1 and 2. By way of example, user devices 220, the router 230, or the server 210 can be a computer as illustrated in FIG. 1. Similarly, the methods and systems disclosed can utilize one or more computers to perform one or more functions in one or more locations. The following descriptions of FIGS. 3-6 describe these methods in detail.

Figure 3:
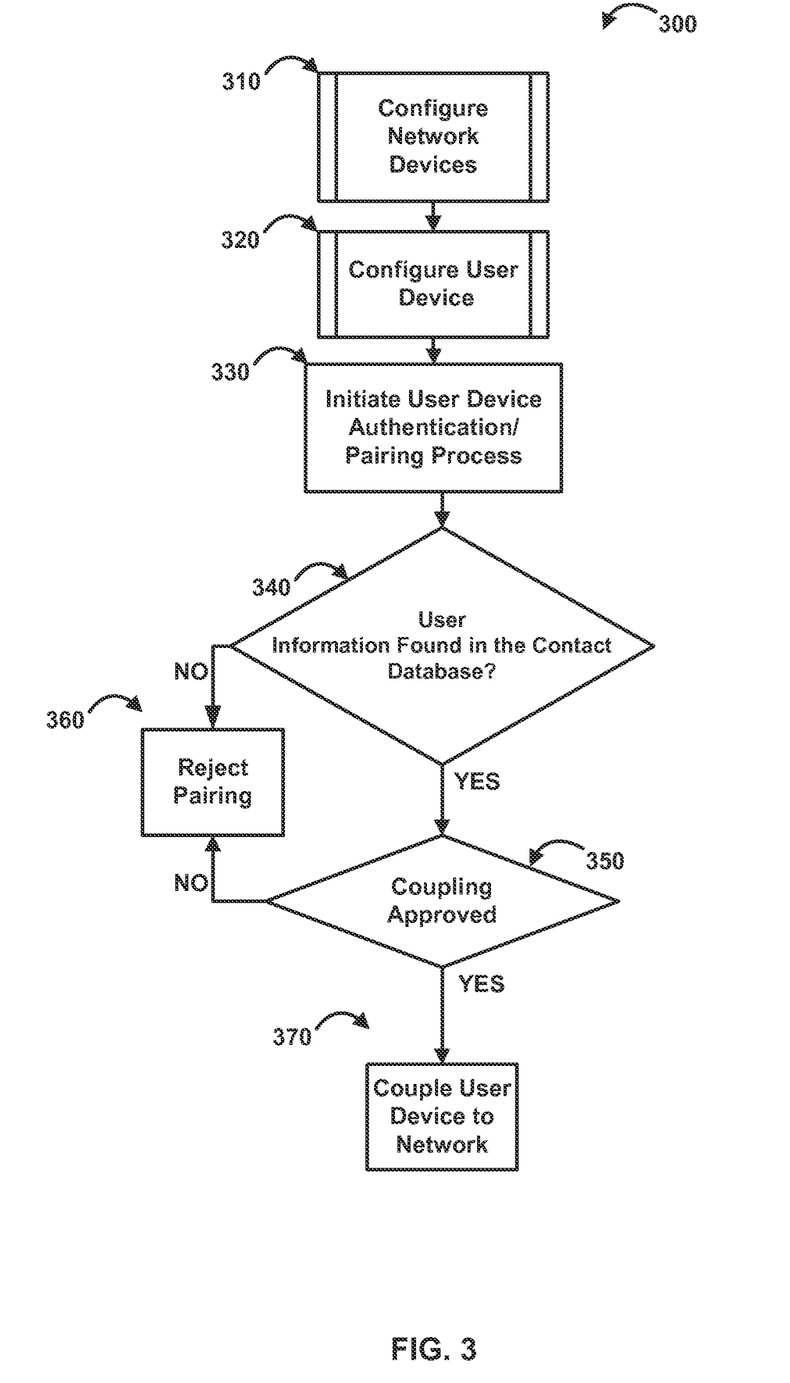
FIG. 3 is a flow chart illustrating an exemplary method.

FIG. 3 illustrates an exemplary method for authenticating and associating a device such as a user device to a network is disclosed. This can be known as device pairing. FIG. 3 is described with reference to FIGS. 1 and 2 for exemplary purposes only and can be implemented with other devices and networks. The method 300 has steps that can occur in any combination of computing devices such as the user device 220, switch/network router 230, and server 210.

At step 310, one or more network devices can be configured. In an aspect, configuration of network devices can comprise installing, activating, and executing a device pairing application via computing devices, such as the server 210 and router 230. In another aspect, the device pairing application executes on both the server 210 and the router 230. The device pairing application can also determine whether to communicate with user device 220 using a proxy on the network 250 or by way of another network such as the Internet 240 over a cellular or other network connection on the user device 220. For example, the user device 220 can communicate with the router 230 using a first network, such as the router's network 250. As a further example, access to the contact information database 260 associated with the user device 220 can occur via a second network, such as, a cellular telecommunications network. Other networks can be used. In an aspect, the server 210 and router 230 can communicate with the user device 220 via the Internet 240 using the second network. As an example, the user device 220 can receive credentials via the second network to allow the user device 220 to connect to the first network. Step 310 is described in greater detail with respect to FIG. 4.

In step 320, a computing device such as the user device 220 can be configured to connect to one or more networks. In an exemplary embodiment, the user device 220 activates a network pairing application for accessing the network 250. The user device 220 can contain or have access to a contact information database 260 that the device 220 makes available to the network pairing application. The contact information database 260 can comprise user identifying information and previous network pairing information. Step 320 is described in greater detail with respect to FIG. 5. Once the user device is configured, the method can continue to step 330.

At step 330, it is determined whether information associated with the network user or owner is stored in the user device 220. In an example aspect, the user device 220 can query the router 230 or a data storage location to request access to a network such as network 250. The device pairing application can execute on one or more computing devices, such as the router 230, on the user device 220, and/or on the server 210. In an aspect, the device pairing application can query the contact information database 260 associated with the user device 220 to determine if the contact information database 260 contains information associated with a particular device, or particular user (e.g., owner, administrator, subscriber, etc.) of the network 250, or a combination thereof. In another aspect, the user device 220 can query the router 230 using the network 250. As an example, the router 230 can respond to the user device 220 using a second network such as Internet 240, a Bluetooth connection, and/or a cellular data network accessible by the user device 220. In an aspect, the device pairing application compares identifying information found within the contact information database 260 associated with the user device 220 to determine if the contact information database 260 includes identification information associated with a particular user of the network 250.

At step 340, if it is determined that the device pairing application cannot find the identification information for a particular user of the network 250 in the contact information database 260 associated with the user device 220, then the method can continue on to step 360, wherein the device-pairing request is rejected. However, if there is a match for the identification information of a particular user of the network 250 in the contact information database 260, the device-pairing request can be approved.

In step 350, approval for network coupling can be executed. In an aspect, the device pairing application executing on the router 230 and/or server 210 communicates with the network user's (e.g., owner, administrator) gateway, computer, mobile device, set-top box, television or other device on the network 250 to prompt the user for approval of the pairing of the user device 220, for example a guest's device, with the network 250. In another aspect, this approval can be automatic in response to a set of preconditions set by the network user. As an example, the preconditions can be stored in a database at the server 210 or the network router 230. As a further example, the network user can pre-approve access to certain individuals and user devices 220, using device and/or owner identifying information such as a phone number or the MAC address of the user device 220. If the network user declines the pairing or if a predetermined time period or event expires before the owner responds, the method can continue to step 360, where the pairing request is rejected. However, if the network owner approves the request, the method can continue to step 370.

In step 370, a device such as the user device 220 can be coupled to the network 250. In an aspect, the router 230 and/or server 210 can transmit credentials such as a network password/key or other network access credentials associated with the network identifying information to the user device 220. As an example, the credentials can be transmitted to the user device 220 over a first network 250 associated with the router 230 or alternatively, the information can be transferred to the user device 220 over a second network associated with the user device 220, such as a cellular data network. As another example, the network pairing application on the user device 220 uses the credential information to connect to the network 250. In another aspect, the device pairing application executing on the router 230 and/or server 210 can send network access credentials that expire after predetermined period of time. In still another aspect, the network access credentials can be based on location information such as a global positioning signal (GPS) in the user device 220, wherein the network access credentials expire once the user device 220 is at some predetermined distance away from the router 230. In yet another aspect, the network access credentials can be tailored to allow the user device 220 to connect to a network 250, while restricting the number of network features available to the user device 220. For example, network features can comprise the ability to control other devices connected to the network, including for example, an alarm system; a lighting system; a heating, ventilation and cooling system; a television set-top box. As a further example, controls can be facilitated such as the ability to remote tune a set-top box; order premium content; share pictures and other content over the network; access to security features; and the like. The device pairing application executing on the router 230 and server 210 can terminate the user device 220 access to the network 250 at any time. For example, as a security measure, the device pairing application can terminate user device 220 access to the network 250 if certain restrictions are violated or if the device pairing application determines that there is a security threat. As a further example, the device pairing application executing on the router 230 and server 210 can remember the MAC address or other identifying information associated with the user device 220, so that future pairing requests can be automatically authenticated.

Figure 4:
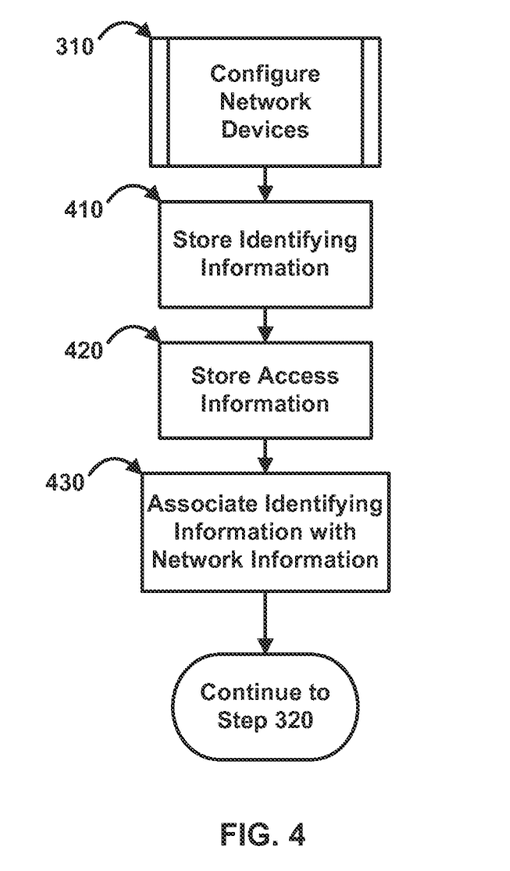
FIG. 4 is a flow chart illustrating an exemplary method.

FIG. 4, which will be discussed with reference to FIGS. 1-3 for exemplary purposes only and can be implemented with other devices and networks, is a flow chart illustrating an exemplary aspect of configuring network devices for coupling a user device with a network. At step 410, network identifying information and user (e.g., owner, administrator) identifying information associated with the network identifying information can be stored for subsequent access, comparison, and/or retrieval. In an aspect, the device pairing application uploads and stores the network user identifying information to a database on the sever 210 or router 230. By way of example, the user identifying information can comprise a phone number, email address, physical address and MAC address of the wireless network, as well as a network password. In an aspect, the user identifying information can be used by the method to determine whether a user device 220 attempting to access the network 250 is authorized by the owner of the network 250, by determining whether matching information is stored on the user device 220, for example in contact information database 260. In another aspect, a user of the network 250 can authorize the user identifying information to be used in the authentication of a user device 220 attempting to access the network 250.

At step 420, information, such as credentials, used to access the network can be stored. In an aspect, a user of the network 250 uploads and/or selects the user network identification information for upload to an authentication database within the router 230 or server 210. The user network identification information can be the account information necessary to access the user's Internet service provider (ISP). This information can also include other identifying information, such the WiFi access password for the router 230. The router 230 can provide the server 210 with network identifying information, network passwords associated with the network identifying information, and other user identifying information associated with the network 250.

At step 430, network identification information can be associated with the user identifying information and the access information. By way of example, the device pairing application within the router 230 or server 210 associates the network identification information from step 410 with the network access information of step 420. If access is granted, network access information can also be passed to the user device 220.

Figure 5:
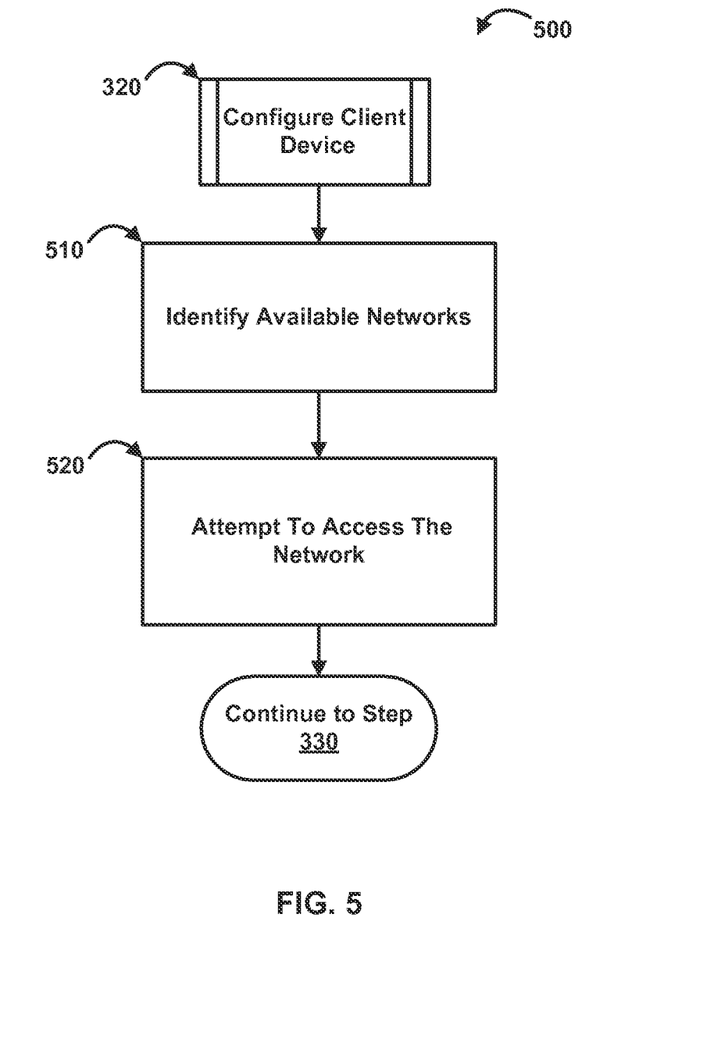
FIG. 5 is a flow chart illustrating an exemplary method.

FIG. 5, which will be discussed with reference to FIGS. 1-3 for exemplary purposes only and can be implemented with other devices and networks, is a flow chart illustrating an exemplary method 500 of configuring a device for connecting (e.g., coupling) to a network. At step 510, a network pairing application executing on the user device 220, identifies networks to join, and a list of found networks are presented to the operator of the user device 220. The operator of the user device 220 can then select a wireless network 250 to join, at step 520. In another aspect, the selection of the wireless network 250 can occur automatically without operator input, if for example, the user device 220 has previously connected to the network 250.

At step 520, the network pairing application executing on the user device 220 can provide the device pairing application of the server 210 and/or router 230 permission to access contact information database 260. Access to the contact information database 260 on the user device 220 can be granted by way of network 250. In an aspect, the access to the contact information database 260 on the user device 220 can be granted by way of using a second network such as cellular data network. As an example, authentication software 106 prompts an operator of the user device 220 to allow this information to be made available to a network authentication application executing on the router 230 and/or server 210. As a further example, access can be provided without prompting the operator of the user device 220. Once the network pairing application selects a network 250 for access, the network adapter 108 within the user device 220 can request access to network 250 from the router 230. The method can then proceeds to step 330 as described with regard to FIG. 3.

While the methods and systems have been described in connection with exemplary embodiments and specific examples, it is not intended that the scope be limited to the particular embodiments set forth, as the embodiments herein are intended in all respects to be illustrative rather than restrictive. For example, although the method is described in terms of a wireless network 250, the method could similarly be applied to wired networks and devices.

Unless otherwise expressly stated, it is in no way intended that any method set forth herein be construed as requiring that the steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application to more fully describe the state of the art to which the methods and systems pertain.

It will be apparent to those skilled in the art that various modifications and variations can be made without departing from the scope or spirit of the disclosure. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method comprising:
receiving, by a network device and from a computing device, a request for the computing device, associated with a first user, to join a network, wherein the request comprises information identifying a second user device associated with a second user, wherein the second user is authorized to grant access to the network;
determining, by the network device and based on the received request, that the information identifying the second user device corresponds to data comprising network identifying information of the second user device; and
causing, by the network device and based on the information identifying the second user device comprising information associated with the network identifying information, the computing device to connect to the network.

2. The method of claim 1, wherein the network identifying information comprises a persistent network identifier and the persistent network identifier comprises a media access control (MAC) address.

3. The method of claim 1, wherein the computing device associated with the first user is a guest device of the network.

4. The method of claim 1, wherein the information identifying the second user device comprises a telephone number, an email address, or a combination thereof.

5. The method of claim 1, wherein connecting the computing device to the network comprises transmitting network access credentials to the computing device.

6. The method of claim 5, wherein the network access credentials expire after a predetermined period of time.

7. The method of claim 5, wherein the network access credentials expire based on a location of the computing device.

8. The method of claim 1, further comprising:
associating user identifying information with the network identifying information; and
determining that permission to couple the computing device has been received prior to connecting the computing device.

9. The method of claim 8, wherein the network identifying information comprises a name, a telephone number, an email address, a physical address, or a combination thereof.

10. The method of claim 8, wherein determining that the information identifying the second user device corresponds to data comprising the network identifying information of the second user device comprises:
determining that the information identifying the second user device matches user identifying information associated with the network identifying information.

11. An apparatus comprising:
one or more processors; and
a memory storing processor-executable instructions that, when executed by the one or more processors, cause the apparatus to:
receive, from a computing device, a request for the computing device associated with a first user to join a network, wherein the request comprises information identifying a second user device associated with a second user, wherein the second user is authorized to grant access to the network;
determine, based on the received request, that the information identifying the second user device corresponds to data comprising network identifying information of the second user device; and
cause, based on determining that the information identifying the second user device corresponds to data comprising the network identifying information, the computing device to connect to the network.

12. The apparatus of claim 11, wherein the network identifying information comprises a persistent network identifier and the persistent network identifier comprises a media access control (MAC) address.

13. The apparatus of claim 11, wherein the computing device associated with the first user is a guest device of the network.

14. The apparatus of claim 11, wherein the information identifying the second user device comprises a telephone number, an email address, or a combination thereof.

15. The apparatus of claim 11, wherein the processor-executable instructions that, when executed by the one or more processors, cause the apparatus to cause the computing device to connect to the network cause the apparatus to send network access credentials to the computing device, wherein the network access credentials expire after a predetermined period of time.

16. The apparatus of claim 11, wherein the processor-executable instructions that, when executed by the one or more processors, cause the apparatus to cause the computing device to connect to the network cause the apparatus to send network access credentials to the computing device, wherein the network access credentials expire based on a location of the computing device.

17. A method comprising:
receiving, by a network device and from a first user device, a request for the first user device associated with a first user to join a network, wherein the request comprises information identifying a second user device, wherein the second user device is authorized to grant access to the network;
determining, by the network device and based on the received request, that the information identifying the second user device corresponds to data comprising network identifying information of the second user device; and
sending, by the network device and based on the information identifying the second user device comprising information associated with the network identifying information, a notification requesting permission to connect the first user device to the network.

18. The method of claim 17, wherein the network identifying information comprises a persistent network identifier and the persistent network identifier comprises a media access control (MAC) address.

19. The method of claim 17, wherein the notification requesting permission comprises one or more of a text message, a message displayed on a set top box, or an email.

20. The method of claim 17, further comprising causing, based on receiving permission to couple the first user device with the network, the first user device to connect to the network.

* * * * *